(12) United States Patent
Adams et al.

(10) Patent No.: US 9,403,260 B1
(45) Date of Patent: Aug. 2, 2016

(54) POLYCRYSTALLINE DIAMOND COMPACTS INCLUDING A POLYCRYSTALLINE DIAMOND TABLE HAVING A MODIFIED REGION EXHIBITING POROSITY AND METHODS OF MAKING SAME

(71) Applicant: US Synthetic Corporation, Orem, UT (US)

(72) Inventors: Stephen R. Adams, Spanish Fork, UT (US); Debkumar Mukhopadhyay, Sandy, UT (US); Kenneth E. Bertagnolli, Riverton, UT (US)

(73) Assignee: US Synthetic Corporation, Orem, UT (US)

( * ) Notice: Subject to any disclaimer, the term of this patent is extended or adjusted under 35 U.S.C. 154(b) by 35 days.

(21) Appl. No.: 14/166,477

(22) Filed: Jan. 28, 2014

(51) Int. Cl.
  B24D 3/00 (2006.01)
  B24D 3/02 (2006.01)
  B24D 11/00 (2006.01)
  B24D 18/00 (2006.01)
  C09K 3/14 (2006.01)
  B24D 3/10 (2006.01)

(52) U.S. Cl.
  CPC .............. B24D 3/10 (2013.01); B24D 18/0009 (2013.01)

(58) Field of Classification Search
  USPC .................................... 51/296, 293, 307, 309
  See application file for complete search history.

(56) References Cited

U.S. PATENT DOCUMENTS

| | | |
|---|---|---|
| 4,268,276 A | 5/1981 | Bovenkerk |
| 4,410,054 A * | 10/1983 | Nagel .................... E21B 4/003 175/107 |
| 4,468,138 A | 8/1984 | Nagel |
| 4,560,014 A | 12/1985 | Geczy |
| 4,738,322 A | 4/1988 | Hall et al. |
| 4,811,801 A | 3/1989 | Salesky et al. |
| 4,913,247 A | 4/1990 | Jones |
| 5,016,718 A | 5/1991 | Tandberg |
| 5,092,687 A | 3/1992 | Hall |
| 5,120,327 A | 6/1992 | Dennis |
| 5,135,061 A | 8/1992 | Newton, Jr. |
| 5,154,245 A | 10/1992 | Waldenstrom et al. |
| 5,364,192 A * | 11/1994 | Damm .................... E21B 4/003 384/304 |
| 5,368,398 A | 11/1994 | Damm et al. |
| 5,460,233 A | 10/1995 | Meany et al. |
| 5,480,233 A * | 1/1996 | Cunningham .......... E21B 4/003 384/304 |
| 5,544,713 A | 8/1996 | Dennis |
| 6,793,681 B1 | 9/2004 | Pope et al. |
| 7,552,782 B1 | 6/2009 | Sexton et al. |
| 7,559,695 B2 | 7/2009 | Sexton et al. |

(Continued)

OTHER PUBLICATIONS

U.S. Appl. No. 13/087,775, filed Apr. 15, 2011, Miess et al.

(Continued)

Primary Examiner — James McDonough
(74) Attorney, Agent, or Firm — Dorsey & Whitney LLP

(57) ABSTRACT

Polycrystalline diamond compacts ("PDCs") and methods of manufacturing such PDCs. In an embodiment, the PDC includes a polycrystalline diamond ("PCD") table having at least a portion of a metal-solvent catalyst removed therefrom. Removing at least a portion of a metal-solvent catalyst from the PCD table may increase the porosity of the PCD table relative to a PCD table that has not been treated to remove the metal-solvent catalyst. Likewise, removing at least a portion of a metal-solvent catalyst from the PCD table may decrease the specific magnetic saturation and increase the coercivity of the PCD table relative to a PCD table that has not been treated to remove the metal-solvent catalyst.

19 Claims, 8 Drawing Sheets

(56) References Cited

U.S. PATENT DOCUMENTS

| | | | | |
|---|---|---|---|---|
| 7,866,418 B2 * | 1/2011 | Bertagnolli | ............... | 175/328 |
| 8,512,865 B2 * | 8/2013 | DiGiovanni | ............ | B22F 7/064 |
| | | | | 428/325 |
| 2013/0000992 A1 * | 1/2013 | DiGiovanni | ............ | B22F 7/064 |
| | | | | 175/432 |

OTHER PUBLICATIONS

ASTM B887-03 (2008) "Standard Test Method for Determination of Coercivity (Hcs) of Cemented Carbides".

ASTM B886-03 (2008), "Standard Test Method for Determination of Magnetic Saturation (Ms) of Cemented Carbides".

* cited by examiner

US 9,403,260 B1

POLYCRYSTALLINE DIAMOND COMPACTS INCLUDING A POLYCRYSTALLINE DIAMOND TABLE HAVING A MODIFIED REGION EXHIBITING POROSITY AND METHODS OF MAKING SAME

BACKGROUND

Wear-resistant, superabrasive compacts are utilized for a variety of mechanical applications. For example, polycrystalline diamond compacts ("PDCs") are used in drilling tools (e.g., cutting elements, gage trimmers, etc.), machining equipment, bearing apparatuses, wire-drawing machinery, and in other mechanical systems.

PDCs have found particular utility as superabrasive cutting elements in rotary drill bits, such as roller cone drill bits and fixed cutter drill bits. A PDC cutting element or cutter typically includes a superabrasive diamond layer or table. The diamond table is formed and bonded to a substrate using a high pressure, high temperature ("HPHT") process. The substrate is often brazed or otherwise joined to an attachment member such as a stud or a cylindrical backing. A stud carrying the PDC may be used as a PDC cutting element when mounted to a bit body of a rotary drill bit by press-fitting, brazing, or otherwise securing the stud into a receptacle formed in the bit body. The PDC cutting element may also be brazed directly into a preformed pocket, socket, or other receptacle formed in the bit body. Generally, a rotary drill bit may include a number of PDC cutting elements affixed to the drill bit body.

Conventional PDCs are normally fabricated by placing a cemented carbide substrate into a container or cartridge with a volume of diamond particles positioned on a surface of the cemented carbide substrate. A number of such cartridges may be typically loaded into an HPHT press. The substrates and volume of diamond particles are then processed under HPHT conditions in the presence of a metal-solvent catalyst that causes the diamond particles to bond to one another to form a matrix of bonded diamond grains defining a diamond table. The metal-solvent catalyst is often a solvent catalyst, such as cobalt, nickel, or iron that is used for facilitating the intergrowth of the diamond particles.

In one conventional approach, a constituent of the cemented carbide substrate, such as cobalt from a cobalt-cemented tungsten carbide substrate, liquefies and sweeps from a region adjacent to the volume of diamond particles into interstitial regions between the diamond particles during the HPHT process. The cobalt acts as a catalyst to facilitate intergrowth between the diamond particles, which results in formation of bonded diamond grains.

The presence of the solvent catalyst in the diamond table is believed to reduce the thermal stability of the diamond table at elevated temperatures. For example, the difference in thermal expansion coefficient between the diamond grains and the solvent catalyst is believed to lead to chipping or cracking in the PDC during drilling or cutting operations, which consequently can degrade the mechanical properties of the PDC or cause failure. Additionally, some of the diamond grains can undergo a chemical breakdown or back-conversion with the solvent catalyst. At extremely high temperatures, portions of diamond grains may transform to carbon monoxide, carbon dioxide, graphite, or combinations thereof, thus, degrading the mechanical properties of the PDC.

Therefore, manufacturers and users of polycrystalline diamond materials continue to seek improved thermally stable, polycrystalline diamond materials and processing techniques.

SUMMARY

Embodiments of the invention relate to PDCs and methods of manufacturing such PDCs. In an embodiment, the PDC includes an unleached polycrystalline diamond ("PCD") table having at least a portion of a metal-solvent catalyst removed therefrom without leaching. Removing at least a portion of a metal-solvent catalyst from the unleached PCD table may increase the porosity of the PCD table relative to a PCD table that has not been treated to remove the metal-solvent catalyst. Likewise, removing at least a portion of a metal-solvent catalyst from the unleached PCD table may decrease the specific magnetic saturation and increase the coercivity of the unleached PCD table relative to a PCD table that has not been treated to remove the metal-solvent catalyst.

In an embodiment, a PDC may include a substrate, and an unleached PCD table attached to the substrate. The PCD table includes an upper surface, at least one lateral surface, and a bonding region bonded to the substrate. The unleached PCD table includes a plurality of bonded diamond grains defining a plurality of interstitial regions. The PCD table includes a modified region that exhibits a porosity of about 1 to about 15% by volume in an unleached condition.

In another embodiment, a method of fabricating a PDC is disclosed. The method includes providing a PDC formed in a first HPHT process, positioning a sink material adjacent to at least the upper surface of the PCD table; and subjecting the PDC and the sink material to a second HPHT process to drive at least a portion of a metal-solvent catalyst out of the polycrystalline diamond table and form a modified region exhibiting porosity. In an embodiment, the porosity of the modified region may increase by at least 1% by volume as a result of the second HPHT process. In an embodiment, the modified region exhibiting the porosity may extend substantially throughout the PCD table.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings.

DETAILED DESCRIPTION

Embodiments of the invention relate to PDCs and methods of manufacturing such PDCs. In an embodiment, the PDC includes an unleached PCD table having at least a portion of a metal-solvent catalyst removed therefrom without leaching. Removing at least a portion of a metal-solvent catalyst from the unleached PCD table increases the porosity of the PCD table relative to a PCD table that has not been treated to remove the metal-solvent catalyst. Likewise, removing at least a portion of the metal-solvent catalyst from the unleached PCD table may result in PCD that exhibits one or more of a higher coercivity, a lower specific magnetic saturation, or a lower specific permeability (i.e., the ratio of specific magnetic saturation to coercivity) when compared to a similarly fabricated PCD table that has not been treated to remove at least a portion of the metal-solvent catalyst.

As will be explained in greater detail below in reference to FIG. 2, the PDC may be fabricated by positioning a plurality of diamond particles adjacent to a substrate and subjecting the plurality of diamond particles (e.g., diamond particles having an average particle size between 0.5 μm to about 150 μm) and the substrate to an HPHT sintering process in the presence of a metal-solvent catalyst, such as cobalt, nickel, iron, or an alloy of any of the preceding metals. The HPHT sintering process in the presence of the metal-solvent catalyst facilitates intergrowth between the diamond particles and form a PCD table comprising interbonded diamond grains defining interstitial regions having the metal-solvent catalyst disposed within at least a portion of the interstitial regions. At least a portion of the metal-solvent catalyst may be removed from the interstitial regions of the PCD table by positioning a sink material adjacent to the PCD table and subjecting the assembly to a second HPHT process to drive a portion of the metal-solvent catalyst into the sink material. Following the second HPHT process, the PCD table includes a plurality of interstitial regions that were previously occupied by a catalyst that forms a network of at least partially interconnected pores.

For example, following the second HPHT process, the PCD table may include a modified region that exhibits a porosity of about 1 to about 15% by volume of the PCD table (e.g., about 2 to about 12% by volume or about 3 to about 12% by volume) that is bounded by the upper surface of the PCD table, at least one lateral surface, and a bonding region joining the PCD table to the substrate. The pores defining the porosity were previously occupied by the metal-solvent catalyst. In an embodiment, the porosity may extend substantially throughout the PCD table in the modified region bounded by the upper surface, the at least one lateral surface, and the bonding region. In an embodiment, the porosity may exhibit a gradient in which the amount of porosity substantially continuously increases with distance from the bonding region.

Figure 1A:
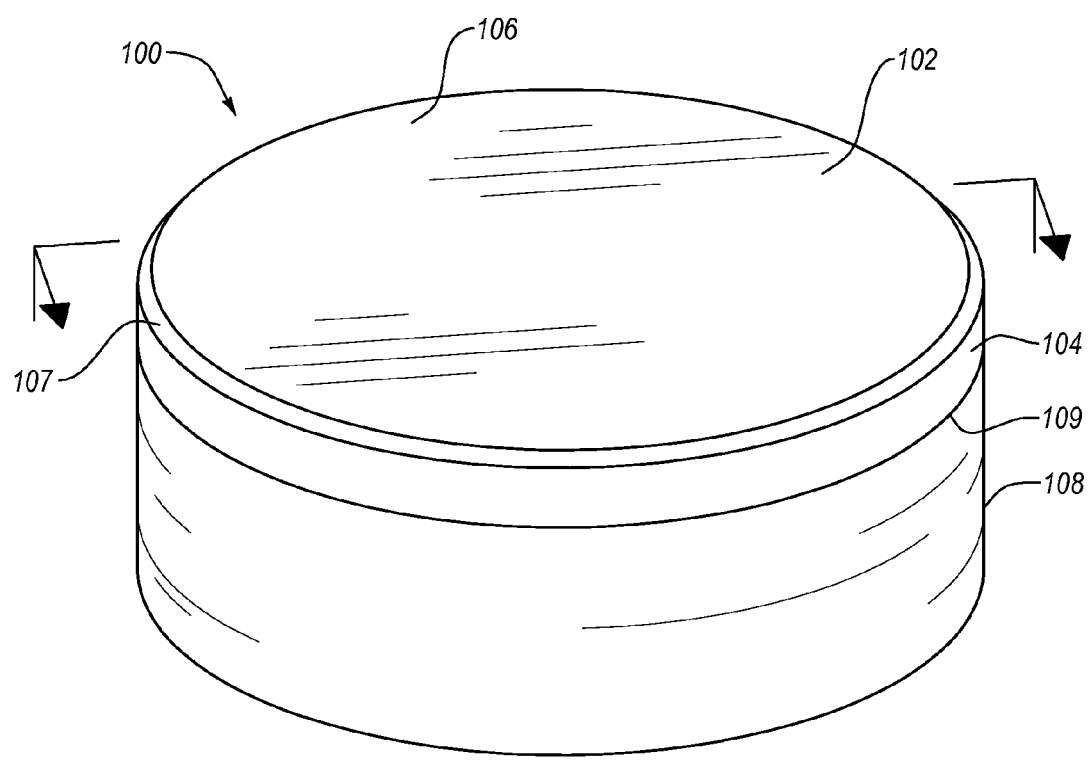
FIG. 1A is an isometric view of an embodiment of a PDC.
Figure 1B:
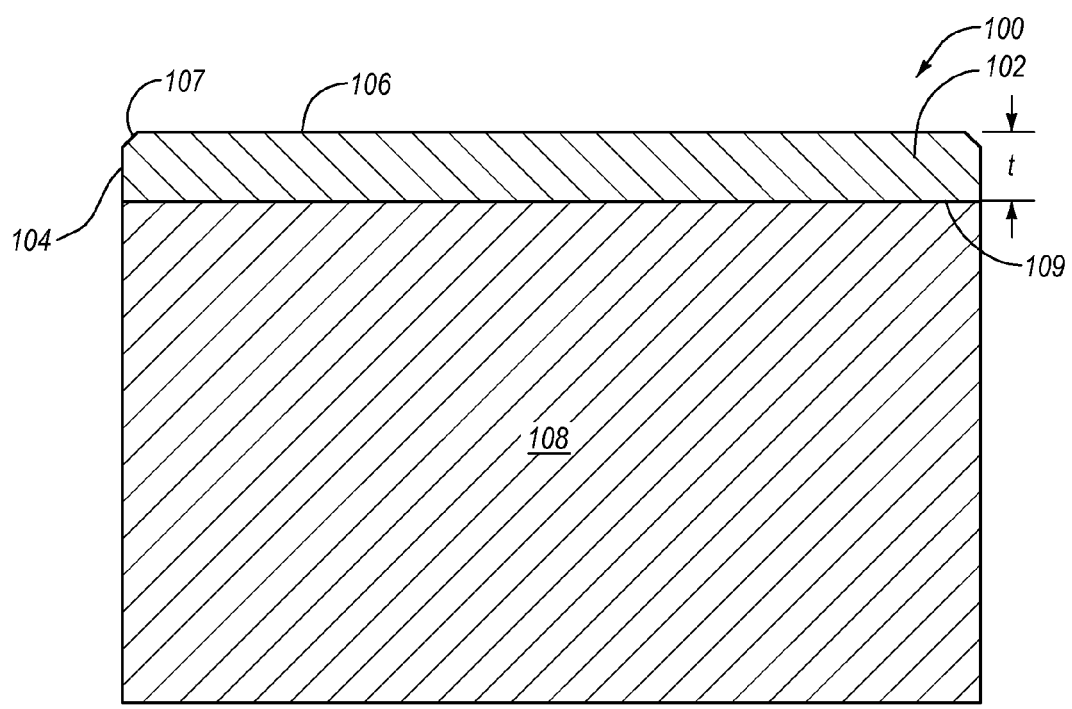
FIG. 1B is a cross-sectional view of the PDC of FIG. 1A.

FIGS. 1A and 1B illustrate isometric and cross-sectional views, respectively, of an embodiment of a PDC 100 including a PCD table 102 integrally formed with and attached to a cemented carbide substrate 108 along an interfacial surface/bonding region 109 thereof. The PCD table 102 includes a plurality of directly bonded-together diamond grains exhibiting diamond-to-diamond bonding (e.g., $sp^3$ bonding) therebetween, which define a plurality of interstitial regions. The PCD table 102 includes at least one lateral surface 104, an upper exterior working surface 106, and an optional chamfer 107 extending therebetween. It is noted that at least a portion of the at least one lateral surface 104 and/or the chamfer 107 may also function as a working surface that contacts a subterranean formation during drilling operations. Additionally, although the interfacial surface 109 is illustrated as being substantially planar, in other embodiments, the interfacial surface 109 may exhibit a selected nonplanar topography. In such embodiments, the PCD table 102 may also exhibit a correspondingly configured nonplanar interfacing topography.

The diamond grains of the PCD table 102 may exhibit an average grain size of about 100 μm or less, about 40 μm or less, such as about 30 μm or less, about 25 μm or less, or about 20 μm or less. For example, the average grain size of the diamond grains may be about 10 μm to about 18 μm, about 8 μm to about 15 μm, about 9 μm to about 12 μm, about 16 μm to about 20 μm, about 26 μm to about 30 μm, or about 15 μm to about 25 μm. In some embodiments, the average grain size of the diamond grains may be about 10 μm or less, such as about 2 μm to about 5 μm or submicron.

The cemented carbide substrate 108 may comprise, for example, a cemented carbide substrate, such as tungsten carbide, tantalum carbide, vanadium carbide, niobium carbide, chromium carbide, titanium carbide, or combinations of the foregoing carbides cemented with iron, nickel, cobalt, or alloys thereof. In an embodiment, the cemented carbide substrate 108 comprises a cobalt-cemented tungsten carbide substrate.

The metal-solvent catalyst (e.g., a cobalt-based catalyst and/or nickel-based catalyst) is provided from the cemented carbide substrate 108 or another source may be disposed within at least some of the interstitial regions of a first region of the PDC table 102. The metal-solvent catalyst comprising the cobalt-based catalyst and/or nickel-based catalyst present in the interstitial regions of the PCD table 102 may be provided at least partially or substantially completely from the cementing constituent of the cemented carbide substrate 108, mixed into the diamond particles before HPHT sintering, or provided from another source such as a metallic foil, powder, paste, powder mixture, or a disc or generally conical or cylindrical member that is inserted between the cemented carbide substrate 108 and the PCD table 102 when attaching the PCD table 102 to the cemented carbide substrate 108.

Referring to the cross-sectional view of the PDC 100 shown in FIG. 1B, the PCD table 102 may exhibit a thickness "t" of at least about 0.040 inch, such as about 0.045 inch to about 0.150 inch, about 0.050 inch to about 0.120 inch, about 0.065 inch to about 0.100 inch, about 0.050 inch to about 0.3 inch, about 0.090 inch to about 0.120 inch, or about 0.070 inch to about 0.090 inch.

Figure 1C:
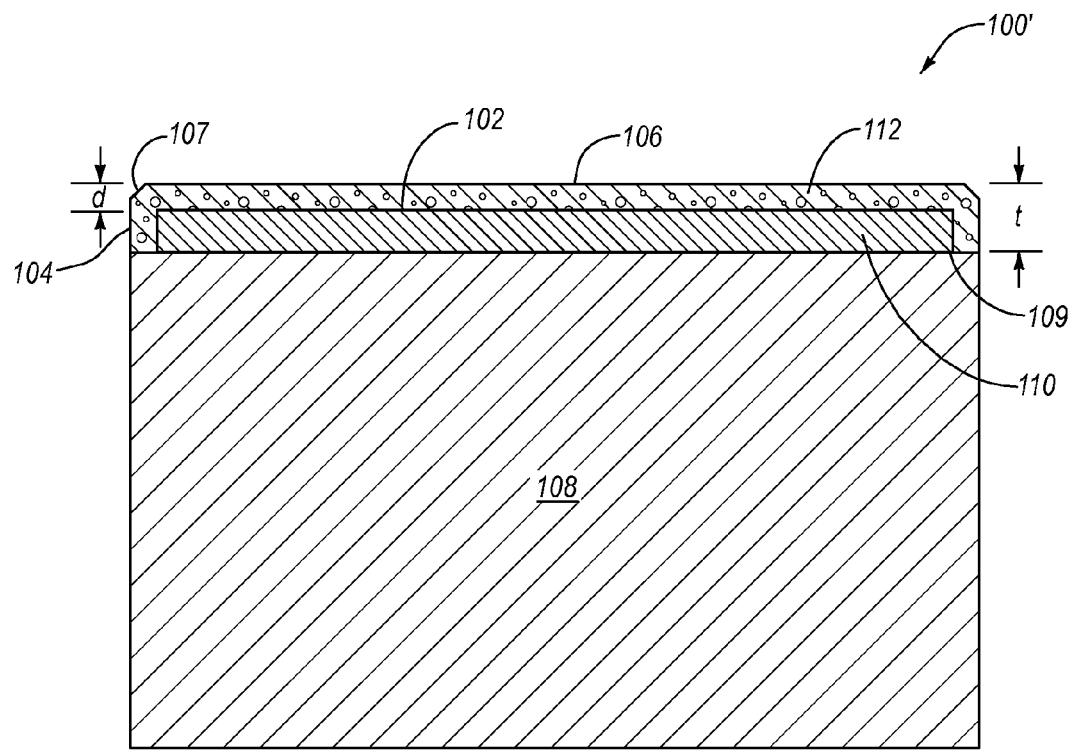
FIG. 1C is a cross-sectional view of the PDC of FIG. 1A having a PCD table that has a modified region of increased porosity.

Referring to FIG. 1C, according to an embodiment, the PCD table 102 may include a first region 110 that extends inwardly from the interfacial surface 109 adjacent to the cemented carbide substrate 108. The PCD table 102 may include a second modified region 112 that extends inwardly from the working surface 106 to an average selected depth "d." The first region 110 may include the metal-solvent catalyst and the metal-solvent catalyst may be at least partially removed from the second modified region 112 according to one or more of the embodiments described herein. The depth "d" of the second modified region 112 may be at least about 200 μm, at least about 500 μm, about 200 μm to about 600 μm, about 500 μm to about 2100 μm, about 750 μm to about 2100 μm, about 950 μm to about 1500 μm, about 1000 μm to about 1750 μm, about 1000 μm to about 2000 μm, about 1500 μm to about 2000 μm, at least about a third of the thickness of the PCD table 102, about half of the thickness of the PCD table 102, or at least about more than half of the thickness of the PCD table 102. In an embodiment, the interstitial regions of the second modified region 112 may be substantially free of the metal-solvent catalyst that is accomplished without leaching. In another embodiment, metal-solvent catalyst may remain in the interstitial regions, but may be reduced. For example, less than 50% by volume of the metal-solvent catalyst may be removed. In an embodiment, the plurality of interstitial regions of second modified region 112 exhibit a porosity of at least 1% by volume to 15% by volume of the PCD table 102 (e.g., at least 2% by volume, at least 3% by volume, at least 4% by volume, at least 5% by volume, at least 6% by volume, at least 7% by volume, at least 8% by volume, at least 9% by volume, at least 10% by volume, at least 11% by volume, at least 12% by volume, at least 13% by volume, or at least 14% by volume). The pores may be empty and unoccupied by any catalyst material or other material. In an embodiment, the porosity may extend substantially throughout the second modified region 112 in a substantially uniform or a non-uniform manner. In an embodiment, the porosity of the second modified region 112 may exhibit a gradient in which the amount of porosity substantially continuously increases with distance from the substrate 108.

In some embodiments, the pores may be infiltrated with another replacement material. For example, the replacement material may include boron trioxide ($B_2O_3$), another oxide of boron, or other suitable material.

Figure 1D:
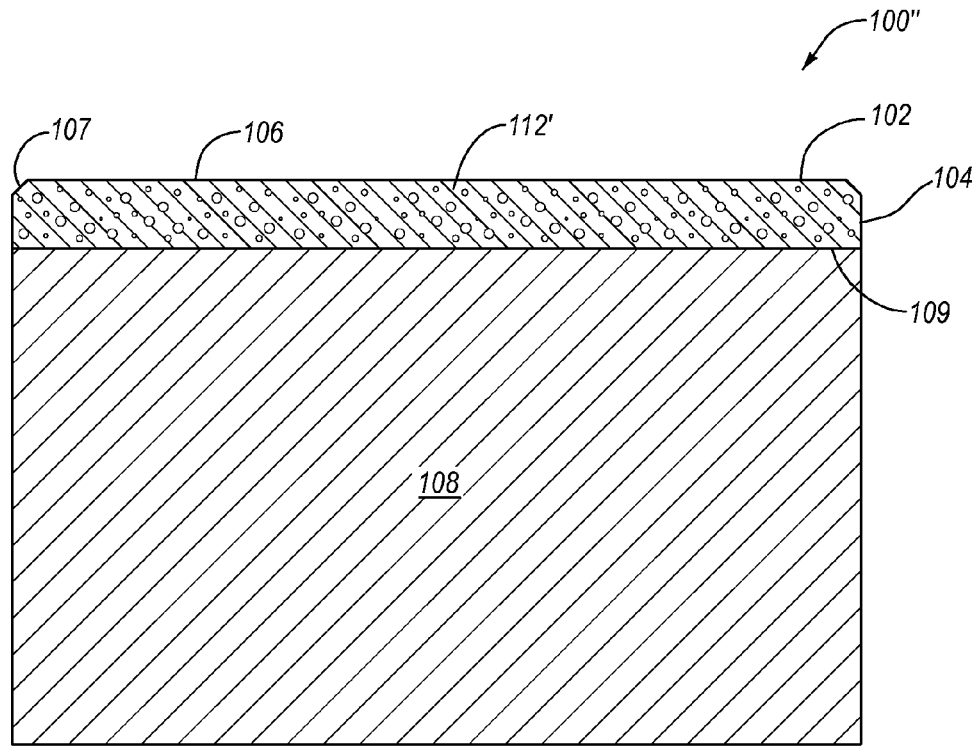
FIG. 1D is a cross-sectional view of another embodiment of a PDC having a PCD table that has increased porosity.

Referring to FIG. 1D, a PDC 100" includes a PCD table 102 that has had at least a portion of the metal-solvent catalyst removed from the interstitial regions of the PCD table 102 according to one or more embodiments described herein in a modified region 112' bounded by the upper surface 106, the at least one lateral surface 104, and the bonding region 109/interfacial surface 109. In an embodiment, the plurality of interstitial regions of the modified region 112' of the PCD table 102 exhibit a porosity of at least 1% by volume to 15% by volume of the PCD table 102 (e.g., at least 2% by volume, at least 3% by volume, at least 4% by volume, at least 5% by volume, at least 6% by volume, at least 7% by volume, at least 8% by volume, at least 9% by volume, at least 10% by volume, at least 11% by volume, at least 12% by volume, at least 13% by volume, or at least 14% by volume) that is accomplished without leaching. In an embodiment, the porosity may extend substantially throughout the PCD table 102 in a substantially uniform or a non-uniform manner. In an embodiment, the porosity may exhibit a gradient in which the amount of porosity substantially continuously increases with distance from the substrate 108. In another embodiment, the porosity may increase as a function of two or more layers having different respective porosities.

Figure 2:
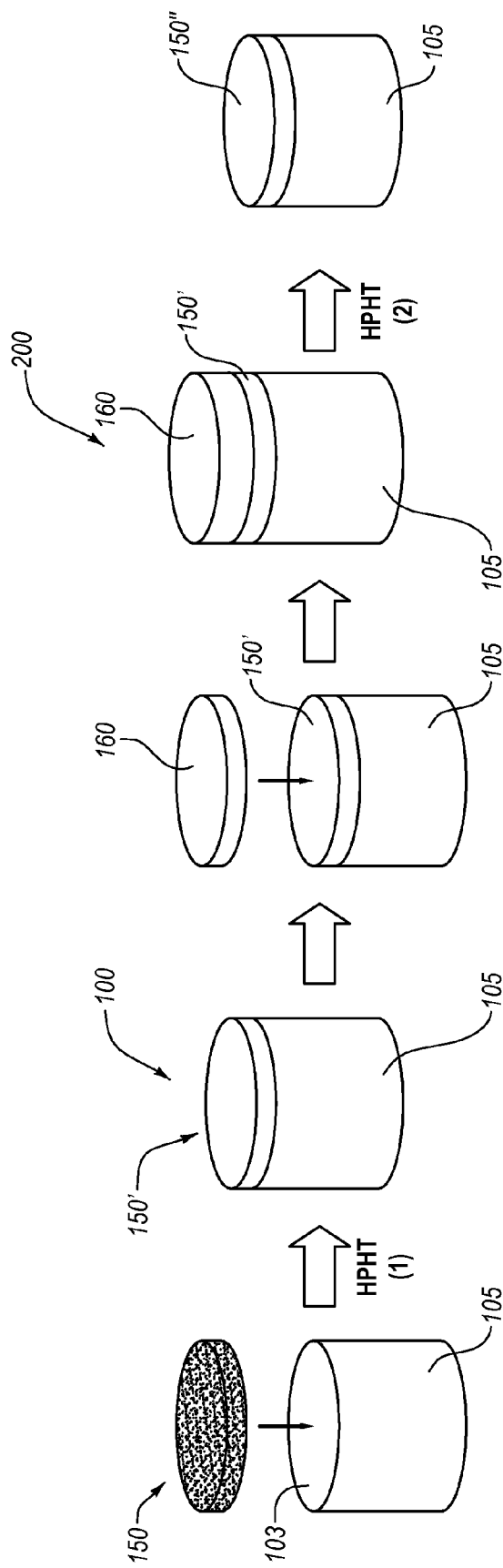
FIG. 2 is a schematic illustration of an embodiment of a method for fabricating the PDCs shown in FIGS. 1A-1D.

FIG. 2 is a schematic illustration of an embodiment of a method for fabricating the PDC 100 shown in FIG. 1A. The plurality of diamond particles of the one or more layers of diamond particles 150 may be positioned adjacent to an interfacial surface 103 of a cemented carbide substrate 105. The cemented carbide substrate 105 and the one or more layers of diamond particles 150 may be placed in a pressure transmitting medium, such as a refractory metal can embedded in pyrophyllite or other pressure transmitting medium.

The pressure transmitting medium, including the cemented carbide substrate 105 and the one or more layers of diamond particles 150 therein, may be subjected to a first HPHT process using an ultra-high pressure cubic press to create temperature and pressure conditions at which diamond is stable. The temperature of the first HPHT process may be at least about 1000° C. (e.g., about 1200° C. to about 1600° C.) and the pressure of the first HPHT process may be at least 5.0 GPa cell pressure (e.g., at least about 7 GPa, about 7.5 GPa to about 12.0 GPa cell pressure, about 7.5 GPa to about 9.0 GPa cell pressure, or about 8.0 GPa to about 10.0 GPa cell pressure) for a time sufficient to sinter the diamond particles 150 to form the PCD table 150'. In some embodiments, one or more transition layers may be disposed between the first cemented carbide substrate 105 and the diamond particles 150 as disclosed in U.S. application Ser. No. 13/087,775, the disclosure of which is incorporated herein, in its entirety, by this reference. Such one or more transition layers may be configured to exhibit increasing porosity with increasing distance from the substrate.

During the first HPHT process, the metal-solvent catalyst cementing constituent (e.g., cobalt) from the first cemented carbide substrate 105 or another source may be liquefied and may infiltrate into the diamond particles of the one or more layers of diamond particles 150. The infiltrated metal-solvent catalyst cementing constituent functions as a catalyst that catalyzes initial formation of directly bonded-together diamond grains to form the PCD table 150'.

It is currently believed by the inventors that forming the PCD by sintering diamond particles at a pressure of at least about 7.5 GPa may promote nucleation and growth of diamond between the diamond particles being sintered so that the volume of the interstitial regions of the PCD so-formed is decreased compared to the volume of interstitial regions if the same diamond particle distribution was sintered at a pressure of, for example, up to about 5.5 GPa and at temperatures where diamond is stable. For example, the diamond may nucleate and grow from carbon provided by dissolved carbon in metal-solvent catalyst (e.g., liquefied cobalt) infiltrating into the diamond particles being sintered, partially graphitized diamond particles, carbon from a substrate, carbon from another source (e.g., graphite particles and/or fullerenes mixed with the diamond particles), or combinations of the foregoing. This nucleation and growth of diamond in combination with the sintering pressure of at least about 7.5 GPa may contribute to the PCD so-formed having a metal-solvent catalyst content of less than about 7.5% by weight.

Whether the first cemented carbide substrate 105 is employed during formation of the PCD table 150' or not, the metal-solvent catalyst may be at least partially removed from the PCD table 150' by exposing the PCD table 150' and the substrate 105 to a second HPHT process in the presence of a sink material 160.

As shown in FIG. 2, the PDC 100 (i.e., the assembly that includes the PCD table 150' and the substrate 105) may be placed in a pressure transmitting medium, such as a refractory metal can embedded in pyrophyllite or other pressure transmitting medium, with a sink material 160 to form an assembly 200. In an embodiment, the sink material 160 is positioned in the pressure transmitting medium such that the sink material 160 contacts at least the upper surface of the PCD table 150'. Suitable examples of materials that may be used for the sink material 160 include, but are not limited to, a large grain diamond material (e.g., a diamond material having an average grain size greater than 50 μm), hexagonal boron nitride, cubic boron nitride, graphitic carbon, or combinations thereof. In addition, the sink material 160 may include a non-catalytic metallic material (e.g., a non-Group VIII metal) that is capable of liquefying under HPHT conditions and infusing into the PCD table 150' and driving at least a portion of the metal-solvent catalyst from the PCD table 150' and into the sink material. During the second HPHT process, the sink material 160 is capable of removing at least a portion of the metal-solvent catalyst from the PCD table 150' to form a PCD table 150" that is depleted of metal-solvent catalyst.

The pressure transmitting medium, including the assembly 200, may be subjected to a second HPHT process using an ultra-high pressure cubic press to create temperature and pressure conditions at which diamond is stable. The temperature of the second HPHT process may be at least about 1000° C. (e.g., about 1200° C. to about 1900° C.) and the pressure of the second HPHT process may be at least 5.0 GPa cell pressure (e.g., about 5.0 GPa to about 12.0 GPa cell pressure). In an embodiment, the second HPHT process includes an exposure time of about 30 seconds to 80 minutes (e.g., about 1 minute to about 15 minutes, about 5 minutes to about 20 minutes, about 15 minutes to about 50 minutes, or about 2 minutes to about 5 minutes) with the sink material 160 in contact with at least the upper surface of the polycrystalline diamond table at any of the pressures disclosed herein and at a temperature of about 1700° C. to about 1900° C. In another embodiment, the second HPHT process includes an exposure time of about 5 minute to about 15 minute with the sink material in contact with at least the upper surface of the polycrystalline diamond table at a temperature of about 1800° C. In some embodiments, the pressure of the second HPHT process may be less than that used in the first HPHT process to limit damage (e.g., cracking) to the PCD table 150'.

In an embodiment, after the second HPHT process, the porosity of the PCD table 150" may be increased to be at least 1% by volume, at least 2% by volume, at least 3% by volume, at least 4% by volume, or at least 5% by volume as a result of the second HPHT process. In another embodiment, after the second HPHT process, the interstitial regions of the PDC table 150" may exhibit a porosity of about 1 to about 15% by volume of the PDC table 150 in a modified region bounded by the upper surface of the PDC table 150", the at least one lateral surface 104, and the bonding region between the PDC table 150", and the substrate 105. In an embodiment, the porosity of about 1 to about 15% by volume (e.g., about 2 to about 15% by volume or about 3 to about 10% by volume) may extend substantially throughout the polycrystalline diamond table 150" or may be localized in a modified region.

It is currently believed by the inventors that that the metal-solvent catalyst does not reinfuse/reinfiltrate into the PCD table 150" from the substrate 105 in the second HPHT process. Likewise, it is believed that the sink material and the second HPHT process may be capable of removing the metal-solvent catalyst substantially all the way down to the interface/bonding region between the PCD table 150" and the substrate 105. Nonetheless, in some embodiments, a residual amount of the metal-solvent catalyst used to catalyze formation of the diamond-to-diamond bonds of the PCD table 150' may still remain in the PCD table 150" in the pores from which the metal-solvent catalyst was driven out even after the second HPHT process. For example, the residual metal-solvent catalyst may be about 0.5% to about 2% by weight, such as about 0.9% to about 1% by weight.

After at least a portion of the metal-solvent catalyst is removed from the PDC table 150" in the second HPHT process, the PCD table 150" defined collectively by the bonded diamond grains and the metal-solvent catalyst may exhibit a coercivity of about 115 Oe or more, a specific magnetic saturation of about 15 G·cm$^3$/g or less, a density of about 3.65 g/cm$^3$ to about 3.80 g/cm$^3$, and a porosity of about 1 to about 15% by volume. In another embodiment, the PCD table 150" may exhibit a coercivity of about 130 Oe or more and a specific magnetic saturation of about 12 G·cm$^3$/g or less, or a coercivity of about 150 Oe or more and a specific magnetic saturation of about 10 G·cm$^3$/g or less. In another embodiment, the PCD table 150" may exhibit a coercivity of about 140 Oe to about 165 Oe, a specific magnetic saturation of about 10 G·cm$^3$/g to about 17 G·cm$^3$/g, and a density of about 3.65 g/cm$^3$ to about 3.75 g/cm$^3$.

In general, the specific magnetic saturation of the PCD table 150" decreases after the second HPHT process and the coercivity increases. The decrease in the specific magnetic saturation indicates that the amount of metal-solvent catalyst in the PCD table 150" is reduced in the second HPHT process. The increase in coercivity is currently believed by the inventors to be affected by the porosity formed in the PCD table 150" after the second HPHT process.

In another embodiment, the coercivity may be about 115 Oe to about 250 Oe and the specific magnetic saturation of the PCD table 150" may be greater than 0 G·cm$^3$/g to about 15 G·cm$^3$/g. In another embodiment, the coercivity may be about 115 Oe to about 175 Oe and the specific magnetic saturation of the PCD may be about 5 G·cm$^3$/g to about 15 G·cm$^3$/g. In yet another embodiment, the coercivity of the PCD table 150" may be about 155 Oe to about 175 Oe and the specific magnetic saturation of the PCD table 150" may be about 10 G·cm$^3$/g to about 15 G·cm$^3$/g. The specific permeability (i.e., the ratio of specific magnetic saturation to coercivity) of the PCD may be about 0.10 G·cm$^3$/g·Oe or less, such as about 0.060 G·cm$^3$/g·Oe to about 0.090 G·cm$^3$/g·Oe. In some embodiments, the average grain size of the bonded diamond grains may be less than about 30 μm and the metal-solvent catalyst content in the PCD table 150" may be less than about 7.5% by weight (e.g., about 1% to about 6% by weight, about 3% to about 6% by weight, or about 1% to about 3% by weight).

The specific magnetic saturation and the coercivity of the PCD table 150" may be tested by a number of different techniques to determine the specific magnetic saturation and coercivity. As merely one example, ASTM B886-03 (2008) provides a suitable standard for measuring the specific magnetic saturation and ASTM B887-03 (2008) e1 provides a suitable standard for measuring the coercivity of the sample region. Although both ASTM B886-03 (2008) and ASTM B887-03 (2008) e1 are directed to standards for measuring magnetic properties of cemented carbide materials, either standard may be used to determine the magnetic properties of PCD. A KOERZIMAT CS 1.096 instrument (commercially available from Foerster Instruments of Pittsburgh, Pa.) is one suitable instrument that may be used to measure the specific magnetic saturation and the coercivity of the sample region based on the foregoing ASTM standards. Additional details about the magnetic properties of PCD tables formed at a cell pressure greater than about 7.5 GPa and magnetic testing techniques can be found in U.S. Pat. No. 7,866,418, which is incorporated herein by reference.

Figure 3A:
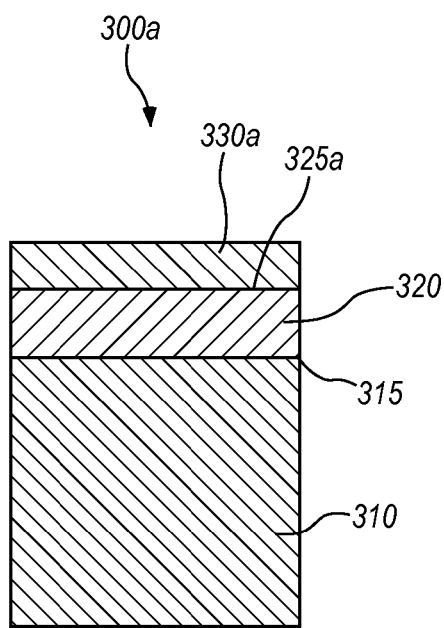
FIG. 3A is a cross-sectional view of a PDC having a sink material positioned on an upper surface of the PDC table, according to an embodiment.

Referring now to FIGS. 3A-3C and 4A-4B, various embodiments of sinks that may be used to remove at least a portion of the metal-solvent catalyst from a PCD table are illustrated in cross section. FIG. 3A illustrates an assembly 300a that includes a substrate 310, a PCD table 320, and a sink 330a. The PCD table 320 is bonded to the substrate 310 at interface 315. The sink 330a it contacts the upper surface 325a of the PCD table 320. The sink 330a may be made from substantially any material that is capable of removing at least a portion of the metal-solvent catalyst from the PCD table 320 in the second HPHT process. Suitable examples of materials that may be used for the sink material 330a include, but are not limited to, a large grain diamond material (e.g., a diamond material having an average grain size greater than 50 μm), hexagonal boron nitride, cubic boron nitride, graphitic carbon, and combinations thereof. Hexagonal boron nitride does not significantly bond to the PCD table 320 in the second HPHT process.

Figure 3B:
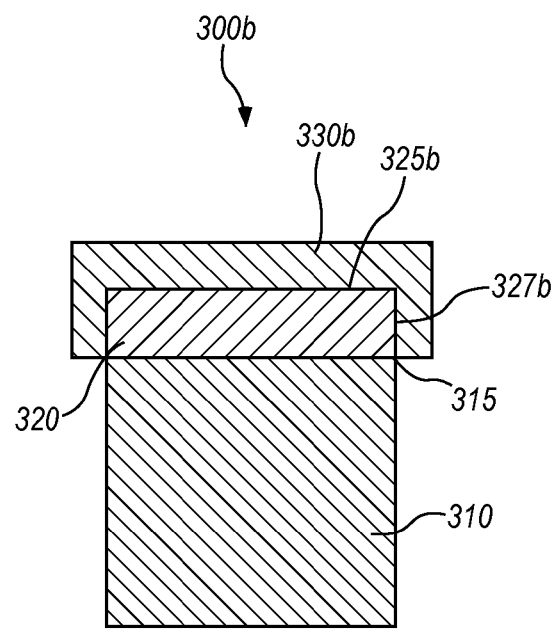
FIG. 3B is a cross-sectional view of a PDC having a sink material positioned on an upper surface and side surfaces of the PDC table, according to an embodiment.

FIG. 3B illustrates an assembly 300b that is similar to assembly 300a. Assembly 300b includes a substrate 310, a PCD table 320, and a sink 330b. The sink 330b contacts the upper 325b surface and at least a portion of the side surface 327b of the PCD table 320. In the embodiment illustrated in FIG. 3B, the sink 330b does not extend substantially beyond the interface 315 between the substrate 310 and the PCD table 320. Contacting the upper surface 325b and the side surface 327b of the PCD table 320 may, for example, allow the sink to remove a greater proportion of the metal-solvent catalyst from the PCD table 320 in the second HPHT process.

Figure 3C:
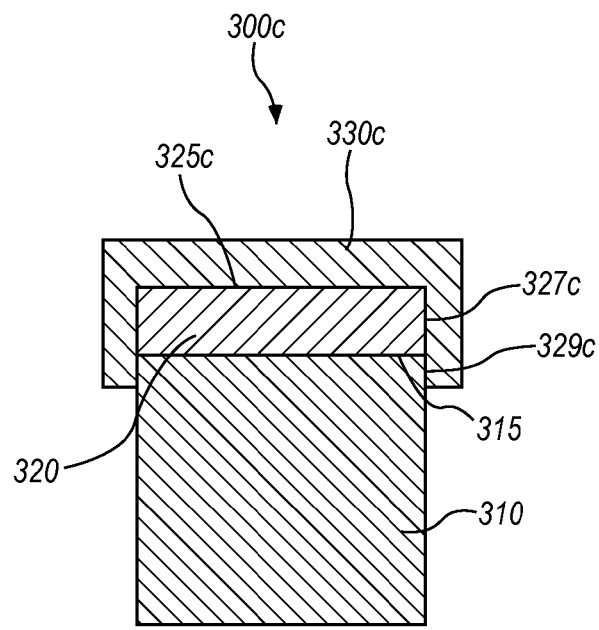
FIG. 3C is a cross-sectional view of a PDC having a sink material positioned on an upper surface and side surfaces of the PDC table and the side surface of the substrate, according to an embodiment.

FIG. 3C illustrates an assembly 300c that is similar to assemblies 300a and 300b. Assembly 300c includes a substrate 310, a PCD table 320, and a sink 330c. The sink 330c contacts the upper 325c surface and side surface 327b of the PCD table 320, and at least a portion of the side surface 329c of the substrate. Contacting the upper surface 325b and the side surface 327b of the PCD table 320 may, for example, allow the sink to remove a greater proportion of the metal-solvent catalyst from the PCD table 320 in the second HPHT process and sometimes from the substrate 310 depending on the processing conditions.

Figure 4A:
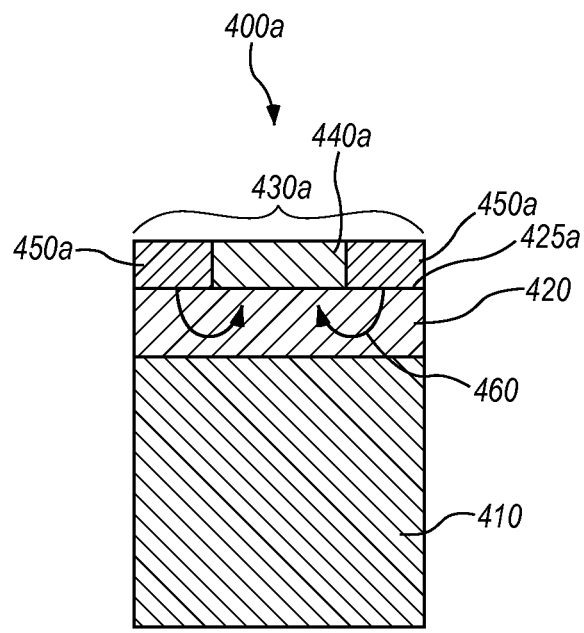
FIG. 4A is a cross-sectional view of a PDC having a sink material and a second material positioned on the upper surface of the PDC table, according to an embodiment.
Figure 4B:
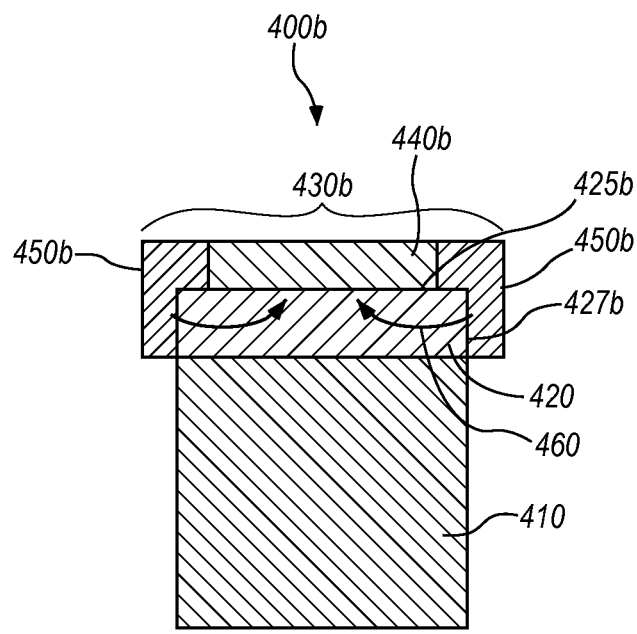
FIG. 4B is a cross-sectional view of a PDC having a sink material positioned on an upper surface of the PDC table and a second material positioned on the upper and side surfaces of the PDC table, according to an embodiment.

Referring now to FIGS. 4A and 4B, assemblies 400a and 400b are illustrated showing additional embodiments of sinks 430a and 430b, respectively. Assemblies 400a and 400b include a substrate 410, a PCD table 420, and sinks 430a and 430b, respectively. Sink 430a is configured to contact substantially only the top surface 425a of the PCD table, while sink 430b is configured to contact the top 425b and side 427b surfaces of the PCD table. Sinks 430a and 430b include a sink material 440a and 440b as described in reference to FIGS. 3A-3C. Furthermore, a metal material 450a and 450b may be provided in assemblies 400a and 400b as shown. The metal material 450a and 450b is configured to melt in the second HPHT process and infuse/infiltrate into the PCD table 420 (as indicated by arrows 460) and displace the metal-solvent catalyst from the PCD table 420 and facilitate the metal-solvent catalyst moving into the sink material 440a and 440b.

Suitable example of metals that may be used to fabricate the metal material 450a and 450b include metals and metal alloys that are compatible with the metal-solvent catalyst and are non-catalytic with respect to diamond formation or back conversion of diamond to other carbon-containing species. Likewise, suitable example of metals and metal alloys may have a melting point below about 1100° C., 1000° C., 900° C., 800° C., 700° C., 600° C., 500° C., 400° C., 300° C., 200° C., 200° C., 100° C., or 50° C. In an embodiment, the metals used to fabricate the metal materials 450a and 450b may include a metal or metals that are capable of forming a eutectic composition with the metal-solvent catalyst (e.g., a cobalt-magnesium composition). Such a composition may have a lower melting point than the one or both components of the eutectic. Consequently, such a eutectic composition may have a lower viscosity under HPHT conditions and may more effectively diffuse the metal-solvent catalyst out of the PCD table into the sink material. In a specific example, suitable metals that may be used to fabricate the metal portion of a sink like those illustrated in FIGS. 4A and 4B include, but are not limited to, copper, aluminum, tin, titanium, gallium, germanium, magnesium, antimony, zinc, or combinations thereof.

In another embodiment, the PCD table 150' shown in FIG. 2 may be fabricated according to any of the disclosed embodiments in a first HPHT process as disclosed herein, separated from the substrate 105 (e.g., by machining or grinding away the substrate 105), and leached to remove substantially all of the metal-solvent catalyst from the interstitial regions between the bonded diamond grains. For example, a residual metallic catalyst may be present in the at least partially leached PCD table after leaching in amount of about 0.8 by weight to about 1.50 by weight and, more particularly, about 0.86 by weight % to about 1.47 by weight. The at least partially leached PCD table may be at least partially surrounded by any of the sink materials disclosed herein and subjected to a second HPHT process using any of the HPHT process conditions disclosed herein. The second HPHT process may help remove additional metal-solvent catalyst and leaching by-products such as metal salts and oxides generated during leaching. For example, additional metal-solvent catalyst and/or leaching by-products may be removed into the sink material during the second HPHT process. In some embodiments, boron trioxide may partially or fully infiltrate the at least partially leached PCD table during the second HPHT process when boron trioxide is used as the sink material.

The cleaned and preformed PCD table may be subsequently bonded to another substrate in a third HPHT process. In the third HPHT process, an infiltrant from, for example, a cemented carbide substrate may infiltrate into the interstitial regions from which the metal-solvent catalyst was depleted. For example, the infiltrant may be cobalt that is swept-in from a cobalt-cemented tungsten carbide substrate. In an embodiment, one or more of the first, second, or third HPHT processes may be performed at a pressure of at least about 7.5 GPa. In an embodiment, the infiltrant may be leached from the infiltrated PCD table to a selected depth using a second acid leaching process following the third HPHT process. In some embodiments, the leached region may be re-infiltrated with a replacement material, such as boron trioxide, another boron oxide, another suitable material, or combinations thereof.

WORKING EXAMPLES

A series of PDCs were made and tested with various sink materials under various condition (e.g., temperature, pressure, and time) in order to assess the ability of the sink material to extract the metal-solvent catalyst from PCD tables when pressed in a hexagonal boron nitride ("HBN") pressure medium under HPHT conditions. The PCD tables separated from their respective cobalt-cemented tungsten carbide substrate and were magnetically tested to determine their specific magnetic saturation, coercivity, and amount of cobalt therein before and after HPHT processing.

Experiment 1

A series PDCs were tested in a series of HPHT cubic press runs where the type of HBN was varied as the sink material. These tests were performed under the following conditions: about 1700° C. for about 30 min at about 49.5 kbar.

Sample 1: Grade AXO5 powder. This is an HBN powder that is commercially available from Momentive Performance Materials of Strongsville, Ohio.

Sample 2: Grade HCR48 is HBN powder with $B_2O_3$ added. The exact amount of $B_2O_3$ was unknown, but it may be as high as 50%. This HBN powder is commercially available from Momentive Performance Materials of Strongsville, Ohio Sample 3: Recycled Grade HCR48 HBN powder that has been through the HPHT press cycle once. The HBN powder is then crushed and pressed again into a pressure medium. The exact amount of $B_2O_3$ was unknown. It is believed to be less than 1%. The grain size of the HBN powder is about 0.030 inch to about 0.050 inch in diameter.

Sample 4: Grade AXO5 disc. The HBN disk was machined to size.

Sample 5: Grade HCJ48 Powder. This is a form of HBN sold by Momentive Performance Materials of Strongsville, Ohio.

Sample 6: Grade HCR48 powder. This is an HBN powder that is sold by Momentive Performance Materials of Strongsville, Ohio.

The results of these tests are illustrated in the Tables 1A-1F.

TABLE 1A

|  | Sample | Weight (g) | Density (g/cm$^3$) | Wt % of Cobalt | Specific Magnetic Saturation (G · cm$^3$/g) | Coercivity (Oe) |
|---|---|---|---|---|---|---|
| Before | 1 | 1.993 | 3.9523 | 7.924 | 15.92 | 128.4 |
| Before | 2 | 1.9418 | 3.9433 | 7.73 | 15.16 | 133.2 |
| Before | 3 | 1.8435 | 3.9589 | 7.933 | 15.88 | 128.5 |
| Before | 4 | 1.8786 | 3.9414 | 7.836 | 15.75 | 132.7 |
| Before | 5 | 1.9939 | 3.9121 | 7.781 | 15.64 | 143.3 |
| Before | 6 | 1.888 | 3.9301 | 7.784 | 15.64 | 132.2 |
| After | 1 | 1.983 | 3.9177 | 7.642 | 15.36 | 138 |
| After | 2 | 1.8578 | 3.788 | 6.11 | 12.28 | 160.4 |
| After | 3 | 1.8314 | 3.9404 | 7.604 | 15.25 | 143 |
| After | 4 | 1.8017 | 3.7815 | 6.407 | 12.89 | 158.6 |
| After | 5 | 1.8919 | 3.7126 | 5.891 | 11.85 | 157.6 |
| After | 6 | 1.8837 | 3.9459 | 7.853 | 15.79 | 148 |

TABLE 1B

| | Weight (g) | | |
|---|---|---|---|
| Sample | Before | After | Difference |
| 1 | 1.99 | 1.98 | 0.01 |
| 2 | 1.94 | 1.86 | 0.08 |
| 3 | 1.84 | 1.83 | 0.01 |
| 4 | 1.88 | 1.80 | 0.08 |
| 5 | 1.99 | 1.89 | 0.10 |
| 6 | 1.89 | 1.88 | 0.00 |

TABLE 1C

| | Density (g/cm$^3$) | | |
|---|---|---|---|
| Sample | Before | After | Difference |
| 1 | 3.95 | 3.92 | 0.03 |
| 2 | 3.94 | 3.79 | 0.16 |
| 3 | 3.96 | 3.94 | 0.02 |
| 4 | 3.94 | 3.78 | 0.16 |
| 5 | 3.91 | 3.71 | 0.20 |
| 6 | 3.93 | 3.95 | −0.02 |

TABLE 1D

| | Wt. % of Cobalt | | | |
|---|---|---|---|---|
| Sample | Before | After | Difference | Percent |
| 1 | 7.92 | 7.64 | 0.28 | −3.56 |
| 2 | 7.73 | 6.11 | 1.62 | −20.96 |

TABLE 1D-continued

| | Wt. % of Cobalt | | | |
|---|---|---|---|---|
| Sample | Before | After | Difference | Percent |
| 3 | 7.93 | 7.60 | 0.33 | −4.15 |
| 4 | 7.84 | 6.41 | 1.43 | −18.24 |
| 5 | 7.78 | 5.89 | 1.89 | −24.29 |
| 6 | 7.78 | 7.85 | −0.07 | 0.89 |

TABLE 1E

| | Specific Magnetic Saturation (G · cm$^3$/g) | | |
|---|---|---|---|
| Sample | Before | After | Difference |
| 1 | 15.92 | 15.36 | 0.56 |
| 2 | 15.16 | 12.28 | 2.88 |
| 3 | 15.88 | 15.25 | 0.63 |
| 4 | 15.75 | 12.89 | 2.86 |
| 5 | 15.64 | 11.85 | 3.79 |
| 6 | 15.64 | 15.79 | −0.15 |

TABLE 1F

| | Coercivity (Oe) | | |
|---|---|---|---|
| Sample | Before | After | Difference |
| 1 | 128.40 | 138.00 | −9.60 |
| 2 | 133.20 | 160.40 | −27.20 |
| 3 | 128.50 | 143.00 | −14.50 |
| 4 | 132.70 | 158.60 | −25.90 |
| 5 | 143.30 | 157.60 | −14.30 |
| 6 | 132.20 | 148.00 | −15.80 |

Experiment 2

In this experiment, a series of PDCs were tested in a series of HPHT cubic press runs with varying cell pressure. These tests were performed under the following conditions: about 1700° C. for about 30 min and the disks were in contact with HBN (HCJ48 grade) as the sink material.

Sample 1—about 42.6 kbar
Sample 2—about 45.7 kbar
Sample 3—about 48.7 kbar
Sample 4—about 51.8 kbar
Sample 5—about 54.8 kbar
Sample 6—about 58.6 kbar The results of these tests are summarized in Tables 2A-2F.

TABLE 2A

| | Sample | Weight (g) | Density (g/cm$^3$) | Wt. % Cobalt | Specific Magnetic Saturation (G · cm$^3$/g) | Coercivity (Oe) |
|---|---|---|---|---|---|---|
| Before | 1 | 1.2131 | 3.9447 | 7.958 | 15.99 | 134.5 |
| Before | 2 | 1.1818 | 3.9485 | 7.904 | 15.88 | 131.8 |
| Before | 3 | 1.2375 | 3.9518 | 8.034 | 16.14 | 132.8 |
| Before | 4 | 1.2046 | 3.9447 | 7.964 | 16 | 131.7 |
| Before | 5 | 1.2074 | 3.9665 | 8.065 | 16.21 | 129.5 |
| Before | 6 | 1.186 | 3.9635 | 8.007 | 16.09 | 133.5 |
| After | 1 | 1.0971 | 3.7736 | 5.417 | 10.88 | 152.2 |
| After | 2 | 1.0878 | 3.7096 | 5.59 | 11.23 | 152.1 |
| After | 3 | 1.1578 | 3.7303 | 5.871 | 11.8 | 152.9 |
| After | 4 | 1.134 | 3.7431 | 5.984 | 12.02 | 153 |
| After | 5 | 1.1407 | 3.7536 | 5.946 | 11.95 | 153.6 |
| After | 6 | 1.1177 | 3.7203 | 5.89 | 11.83 | 156.1 |

TABLE 2B

| Sample | Pressure Step 2 results | Weight (g) Before | After | Difference |
|---|---|---|---|---|
| 1 | 42.6 kbar | 1.21 | 1.10 | 0.12 |
| 2 | 45.7 kbar | 1.18 | 1.09 | 0.09 |
| 3 | 48.7 kbar | 1.24 | 1.16 | 0.08 |
| 4 | 51.8 kbar | 1.20 | 1.13 | 0.07 |
| 5 | 54.8 kbar | 1.21 | 1.14 | 0.07 |
| 6 | 58.6 kbar | 1.19 | 1.12 | 0.07 |

TABLE 2C

| Sample | Pressure Step 2 results | Density (g/cm$^3$) Before | After | Difference |
|---|---|---|---|---|
| 1 | 42.6 kbar | 3.94 | 3.77 | 0.17 |
| 2 | 45.7 kbar | 3.95 | 3.71 | 0.24 |
| 3 | 48.7 kbar | 3.95 | 3.73 | 0.22 |
| 4 | 51.8 kbar | 3.94 | 3.74 | 0.20 |
| 5 | 54.8 kbar | 3.97 | 3.75 | 0.21 |
| 6 | 58.6 kbar | 3.96 | 3.72 | 0.24 |

TABLE 2D

| Sample | Pressure Step 2 results | Wt. % of Cobalt Before | After | Difference | % Difference |
|---|---|---|---|---|---|
| 1 | 42.6 kbar | 7.96 | 5.42 | 2.54 | −31.93 |
| 2 | 45.7 kbar | 7.90 | 5.59 | 2.31 | −29.28 |
| 3 | 48.7 kbar | 8.03 | 5.87 | 2.16 | −26.92 |
| 4 | 51.8 kbar | 7.96 | 5.98 | 1.98 | −24.86 |
| 5 | 54.8 kbar | 8.07 | 5.95 | 2.12 | −26.27 |
| 6 | 58.6 kbar | 8.01 | 5.89 | 2.12 | −26.44 |

TABLE 2E

| Sample | Pressure Step 2 results | Specific Magnetic Saturation (G · cm$^3$/g) Before | After | Difference |
|---|---|---|---|---|
| 1 | 42.6 kbar | 15.99 | 10.88 | 5.11 |
| 2 | 45.7 kbar | 15.88 | 11.23 | 4.65 |
| 3 | 48.7 kbar | 16.14 | 11.80 | 4.34 |
| 4 | 51.8 kbar | 16.00 | 12.02 | 3.98 |
| 5 | 54.8 kbar | 16.21 | 11.95 | 4.26 |
| 6 | 58.6 kbar | 16.09 | 11.83 | 4.26 |

TABLE 2F

| Sample | Pressure Step 2 results | Coercivity (Oe) Before | After | Difference |
|---|---|---|---|---|
| 1 | 42.6 kbar | 134.50 | 152.20 | −17.70 |
| 2 | 45.7 kbar | 131.80 | 152.10 | −20.30 |
| 3 | 48.7 kbar | 132.80 | 152.90 | −20.10 |
| 4 | 51.8 kbar | 131.70 | 153.00 | −21.30 |
| 5 | 54.8 kbar | 129.50 | 153.60 | −24.10 |
| 6 | 58.6 kbar | 133.50 | 156.10 | −22.60 |

Experiment 3

In this experiment, a series of HPHT cubic press runs were conducted to test various exposure times to HPHT conditions. Samples 1-6 were performed under the following conditions: 1800° C. soak with the disks in contact with HBN (HCJ48 grade), at 42.6 kbar cell pressure. Samples 7-12 were performed under the following conditions: 1700° C. soak with the disks in contact with HBN (HCJ48 grade) as the sink material, at 58.6 kbar cell pressure.

Sample 1—about 1 sec
Sample 2—about 10 sec
Sample 3—about 30 sec
Sample 4—about 1 min
Sample 5—about 2 min
Sample 6—about 4 min
Sample 7—about 5 min
Sample 8—about 10 min
Sample 9—about 20 min
Sample 10—about 40 min
Sample 11—about 80 min
Sample 12—about 160 min The results of these tests are summarized in Tables 3A-3I.

TABLE 3A

| Before Sample | Weight (g) | Density (g/cm$^3$) | Wt. % of Cobalt | Specific Magnetic Saturation (G · cm$^3$/g) | Coercivity (Oe) |
|---|---|---|---|---|---|
| 1 | 1.2167 | 3.9422 | 8.257 | 16.59 | 131.1 |
| 2 | 1.2219 | 3.9313 | 8.222 | 16.52 | 145.5 |
| 3 | 1.2289 | 3.9522 | 8.08 | 16.24 | 135.9 |
| 4 | 1.2498 | 3.9629 | 8.207 | 16.49 | 131.7 |
| 5 | 1.2193 | 3.9817 | 8.506 | 17.1 | 134.9 |
| 6 | 1.1053 | 3.977 | 8.474 | 17.03 | 138.3 |

TABLE 3B

| Post HPHT Processing Sample | Weight (g) | Density (g/cm$^3$) | Wt. % of Cobalt | Specific Magnetic Saturation (G · cm$^3$/g) | Coercivity (Oe) |
|---|---|---|---|---|---|
| 1 | 1.147 | 3.7161 | 6.142 | 12.33 | 149.5 |
| 2 | 1.1519 | 3.7011 | 6.288 | 12.63 | 160.2 |
| 3 | 1.1658 | 3.7554 | 6.102 | 12.26 | 154.8 |
| 4 | 1.1715 | 3.7307 | 6.032 | 12.12 | 152.5 |
| 5 | 1.1389 | 3.7422 | 6.411 | 12.88 | 155.1 |
| 6 | 1.0231 | 3.7479 | 6.258 | 12.57 | 157.2 |

TABLE 3C

| Sample | Weight Lost (g) | Density Lost (g/cm$^3$) | Wt. % of Cobalt Lost | Specific Magnetic Saturation (G · cm$^3$/g) Lost | Coercivity (Oe) Lost |
|---|---|---|---|---|---|
| 1 | 0.0697 | 0.2261 | 2.115 | 4.26 | −18.4 |
| 2 | 0.07 | 0.2302 | 1.934 | 3.89 | −14.7 |
| 3 | 0.0631 | 0.1968 | 1.978 | 3.98 | −18.9 |
| 4 | 0.0783 | 0.2322 | 2.175 | 4.37 | −20.8 |
| 5 | 0.0804 | 0.2395 | 2.095 | 4.22 | −20.2 |
| 6 | 0.0822 | 0.2291 | 2.216 | 4.46 | −18.9 |

TABLE 3D

| Time | Sample | Weight (g) | Density Wt. % of Cobalt | Wt. % of Cobalt | Specific Magnetic Saturation (G · cm$^3$/g) | Coercivity (Oe) |
|---|---|---|---|---|---|---|
| Before | 7 | 1.1866 | 3.9509 | 7.983 | 16.04 | 131.5 |
| Before | 8 | 1.2523 | 3.9554 | 7.939 | 15.95 | 132.7 |
| Before | 9 | 1.2117 | 3.9478 | 7.937 | 15.95 | 133.8 |
| Before | 10 | 1.2241 | 3.9623 | 8.063 | 16.2 | 126.5 |
| Before | 11 | 1.2154 | 3.9419 | 8.071 | 16.22 | 131.3 |
| Before | 12 | 1.1939 | 3.9567 | 8.015 | 16.11 | 133.6 |

TABLE 3D-continued

| Time | Sample | Weight (g) | Density Wt. % of Cobalt | Wt. % of Cobalt | Specific Magnetic Saturation (G·cm³/g) | Coercivity (Oe) |
|---|---|---|---|---|---|---|
| After | 7 | 1.1212 | 3.7366 | 5.62 | 11.29 | 162.4 |
| After | 8 | 1.1759 | 3.7381 | 5.727 | 11.51 | 163.8 |
| After | 9 | 1.1409 | 3.71 | 5.859 | 11.77 | 157.9 |
| After | 10 | 1.1416 | 3.7536 | 5.927 | 11.91 | 161.4 |
| After | 11 | 1.1565 | 3.7782 | 6.202 | 12.46 | 153.7 |
| After | 12 | 1.1077 | 3.737 | 5.967 | 11.99 | 146.2 |

TABLE 3E

| | | Weight (g) | | |
|---|---|---|---|---|
| Sample | Time | Before | After | Difference |
| 7 | 5 min | 1.19 | 1.12 | 0.07 |
| 8 | 10 min | 1.25 | 1.18 | 0.08 |
| 9 | 20 min | 1.21 | 1.14 | 0.07 |
| 10 | 40 min | 1.22 | 1.14 | 0.08 |
| 11 | 80 min | 1.22 | 1.16 | 0.06 |
| 12 | 160 min | 1.19 | 1.11 | 0.09 |

TABLE 3F

| | | Density (g/cm³) | | |
|---|---|---|---|---|
| Sample | Time | Before | After | Difference |
| 7 | 5 min | 3.95 | 3.74 | 0.21 |
| 8 | 10 min | 3.96 | 3.74 | 0.22 |
| 9 | 20 min | 3.95 | 3.71 | 0.24 |
| 10 | 40 min | 3.96 | 3.75 | 0.21 |
| 11 | 80 min | 3.94 | 3.78 | 0.16 |
| 12 | 160 min | 3.96 | 3.74 | 0.22 |

TABLE 3G

| | | Wt. % of Cobalt | | | |
|---|---|---|---|---|---|
| Sample | Time | Before | After | Difference | % Difference |
| 7 | 5 min | 7.98 | 5.62 | 2.36 | −29.60 |
| 8 | 10 min | 7.94 | 5.73 | 2.21 | −27.86 |
| 9 | 20 min | 7.94 | 5.86 | 2.08 | −26.18 |
| 10 | 40 min | 8.06 | 5.93 | 2.14 | −26.49 |
| 11 | 80 min | 8.07 | 6.20 | 1.87 | −23.16 |
| 12 | 160 min | 8.02 | 5.97 | 2.05 | −25.55 |

TABLE 3H

| | | | Specific Magnetic Saturation (G·cm³/g) | | |
|---|---|---|---|---|---|
| Sample | Time | Sample | Before | After | Difference |
| 7 | 5 min | 7 | 16.04 | 11.29 | 4.75 |
| 8 | 10 min | 8 | 15.95 | 11.51 | 4.44 |
| 9 | 20 min | 9 | 15.95 | 11.77 | 4.18 |
| 10 | 40 min | 10 | 16.20 | 11.91 | 4.29 |
| 11 | 80 min | 11 | 16.22 | 12.46 | 3.76 |
| 12 | 160 min | 12 | 16.11 | 11.99 | 4.12 |

TABLE 3I

| | | Coercivity (Oe) | | |
|---|---|---|---|---|
| Sample | Time | Before | After | Difference |
| 7 | 5 min | 131.50 | 162.40 | −30.90 |
| 8 | 10 min | 132.70 | 163.80 | −31.10 |
| 9 | 20 min | 133.80 | 157.90 | −24.10 |
| 10 | 40 min | 126.50 | 161.40 | −34.90 |
| 11 | 80 min | 131.30 | 153.70 | −22.40 |
| 12 | 160 min | 133.60 | 146.20 | −12.60 |

Experiment 4

In this experiment, a series of HPHT cubic press runs were conducted to test the effect of temperature. These tests were performed under the following conditions: 5 min soak with the disks in contact with HBN (HCJ48 grade), at about 45.7 kbar.

Sample 1—about 1900° C.
Sample 2—about 1400° C.
Sample 3—about 1500° C.
Sample 4—about 1600° C.
Sample 5—about 1700° C.
Sample 6—about 1800° C.

The results of these tests are summarized in Tables 4A-4F.

TABLE 4A

| | Sample | Weight (g) | Density (g/cm³) | Wt. % of Cobalt | Specific Magnetic Saturation (G·cm³/g) | Coercivity (Oe) |
|---|---|---|---|---|---|---|
| Before | 1 | 1.2988 | 3.9536 | 7.979 | 16.03 | 136.1 |
| Before | 2 | 1.2248 | 3.9531 | 7.901 | 15.88 | 132.4 |
| Before | 3 | 1.167 | 3.9469 | 7.859 | 15.79 | 135.8 |
| Before | 4 | 1.2216 | 3.9555 | 7.794 | 15.66 | 134.7 |
| Before | 5 | 1.2449 | 3.9373 | 7.774 | 15.62 | 134.7 |
| Before | 6 | 1.2102 | 3.9523 | 7.877 | 15.83 | 133.2 |
| After | 1 | 1.1949 | 3.7325 | 5.602 | 11.26 | 152.7 |
| After | 2 | 1.2233 | 3.9333 | 8.56 | 17.2 | 150.4 |
| After | 3 | 1.1559 | 3.9068 | 7.893 | 15.86 | 151.6 |
| After | 4 | 1.16 | 3.7693 | 6.229 | 12.52 | 152.8 |
| After | 5 | 1.1649 | 3.7058 | 5.607 | 11.27 | 156.6 |
| After | 6 | 1.1263 | 3.7066 | 5.615 | 11.28 | 153.6 |

TABLE 4B

| | | Weight (g) | | |
|---|---|---|---|---|
| Sample | Temperature | Before | After | Difference |
| 1 | 1900° C. | 1.30 | 1.19 | 0.10 |
| 2 | 1400° C. | 1.22 | 1.22 | 0.00 |
| 3 | 1500° C. | 1.17 | 1.16 | 0.01 |
| 4 | 1600° C. | 1.22 | 1.16 | 0.06 |
| 5 | 1700° C. | 1.24 | 1.16 | 0.08 |
| 6 | 1800° C. | 1.21 | 1.13 | 0.08 |

TABLE 4C

| | | Density (g/cm³) | | |
|---|---|---|---|---|
| Sample | Temperature | Before | After | Difference |
| 1 | 1900° C. | 3.95 | 3.73 | 0.22 |
| 2 | 1400° C. | 3.95 | 3.93 | 0.02 |
| 3 | 1500° C. | 3.95 | 3.91 | 0.04 |
| 4 | 1600° C. | 3.96 | 3.77 | 0.19 |

TABLE 4C-continued

| | | Density (g/cm³) | | |
|---|---|---|---|---|
| Sample | Temperature | Before | After | Difference |
| 5 | 1700° C. | 3.94 | 3.71 | 0.23 |
| 6 | 1800° C. | 3.95 | 3.71 | 0.25 |

TABLE 4D

| | | Wt. % of Cobalt | | | |
|---|---|---|---|---|---|
| Sample | Temperature | Before | After | Difference | % Difference |
| 1 | 1900° C. | 7.98 | 5.60 | 2.38 | −29.79 |
| 2 | 1400° C. | 7.90 | 8.56 | −0.66 | 8.34 |
| 3 | 1500° C. | 7.86 | 7.89 | −0.03 | 0.43 |
| 4 | 1600° C. | 7.79 | 6.23 | 1.57 | −20.08 |
| 5 | 1700° C. | 7.77 | 5.61 | 2.17 | −27.87 |
| 6 | 1800° C. | 7.88 | 5.62 | 2.26 | −28.72 |

TABLE 4E

| | | Specific Magnetic Saturation (G · cm³/g) | | |
|---|---|---|---|---|
| Sample | Temperature | Before | After | Difference |
| 1 | 1900° C. | 16.03 | 11.26 | 4.77 |
| 2 | 1400° C. | 15.88 | 17.20 | −1.32 |
| 3 | 1500° C. | 15.79 | 15.86 | −0.07 |
| 4 | 1600° C. | 15.66 | 12.52 | 3.14 |
| 5 | 1700° C. | 15.62 | 11.27 | 4.35 |
| 6 | 1800° C. | 15.83 | 11.28 | 4.55 |

TABLE 4F

| | | Coercivity (Oe) | | |
|---|---|---|---|---|
| Sample | Temperature | Before | After | Difference |
| 1 | 1900° C. | 136.10 | 152.70 | −16.60 |
| 2 | 1400° C. | 132.40 | 150.40 | −18.00 |
| 3 | 1500° C. | 135.80 | 151.60 | −15.80 |
| 4 | 1600° C. | 134.70 | 152.80 | −18.10 |
| 5 | 1700° C. | 134.70 | 156.60 | −21.90 |
| 6 | 1800° C. | 133.20 | 153.60 | −20.40 |

Based on the specific magnetic saturation measurements, it appears that metal-solvent catalyst is being driven out of the PCD tables when the PDCs are exposed to HPHT conditions in the presence of a sink material. Based on the forgoing experiments, it appears that suitable decreases in specific magnetic saturation and increases in coercivity may be achieved at a soak time of about 30 seconds to 80 minutes with the disks in contact with HBN (HCJ48 grade), at 42.6 kbar to 58.6 kbar cell pressure and about 1700° C. to about 1900° C. The processing conditions for the second HPHT process include a 5 min soak with the PCD disks in contact with HBN (HCJ48 grade), at about 45.7 kbar and 1800° C.

Without being tied to any single theory, it is believed that the metal-solvent catalyst (e.g., about 25-30% by weight) is extracted from the PCD tables by the metal-solvent catalyst moving from a higher pressure state as a solid in the PCD table to a lower pressure state in the sink (e.g., HBN) as a liquid. For example, when the PCD table is being heated, the metal-solvent catalyst inside converts from a solid to a liquid and expands. This expansion may relieve pressure from inside the PCD table and allow the metal-solvent catalyst to flow out of the small voids in the PCD structure into the HBN medium. The higher the temperature, the lower the viscosity of the metal-solvent catalyst, which means the -solvent catalyst may have a greater ability to flow through the small pores in the polycrystalline structure and out of the disk. There may be some capillary forces or chemical affinity that promote the flow of the metal-solvent catalyst. It is believed that the reasons for the metal-solvent catalyst movement out of the PCD table are physical, mechanical, chemical, or combinations thereof.

Embodiments of Applications for PCD and PDCS

The PDCs formed according to the various embodiments disclosed herein may be used as PDC cutting elements on a rotary drill bit. For example, in a method according to an embodiment of the invention, one or more PDCs may be received that were fabricated according to any of the disclosed manufacturing methods and attached to a bit body of a rotary drill bit.

Figure 5A:
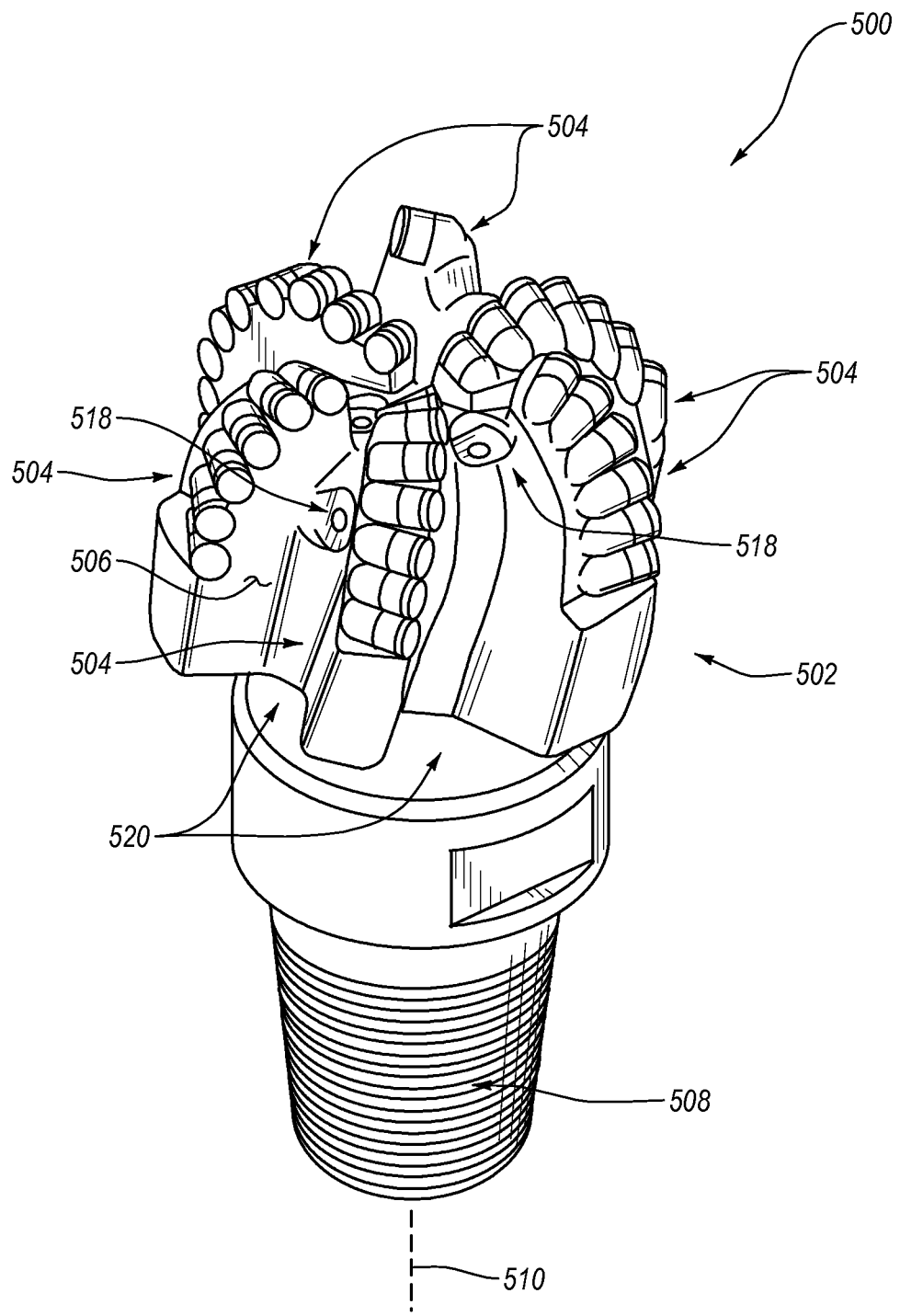
FIG. 5A is an isometric view of an embodiment of a rotary drill bit that may employ one or more of the disclosed PDC embodiments as cutting elements.
Figure 5B:
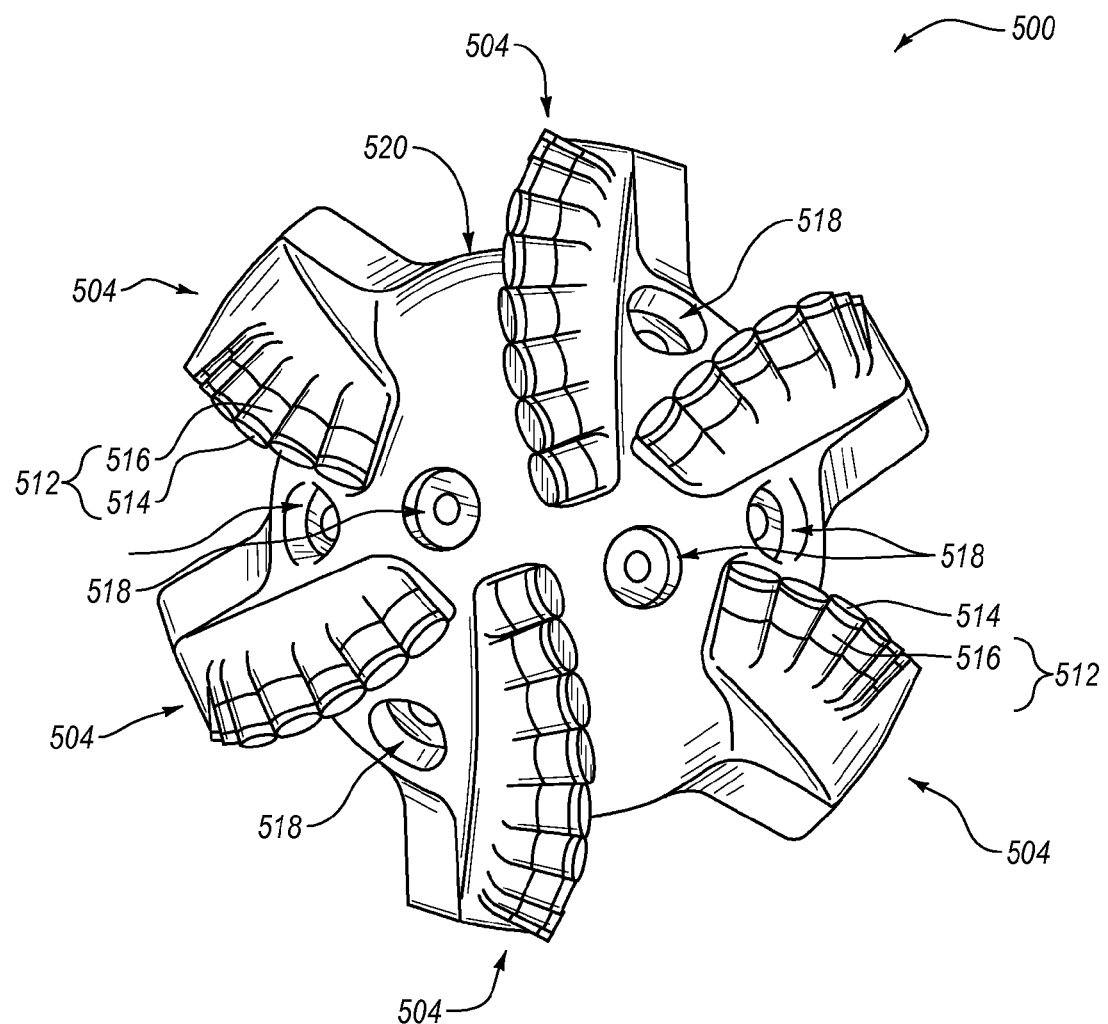
FIG. 5B is a top elevation view of the rotary drill bit shown in FIG. 5A.

FIG. 5A is an isometric view and FIG. 5B is a top elevation view of an embodiment of a rotary drill bit 500 that includes at least one PDC configured and/or fabricated according to any of the disclosed PDC embodiments. The rotary drill bit 500 comprises a bit body 502 that includes radially-extending and longitudinally-extending blades 504 having leading faces 506, and a threaded pin connection 508 for connecting the bit body 502 to a drilling string. The bit body 502 defines a leading end structure for drilling into a subterranean formation by rotation about a longitudinal axis 510 and application of weight-on-bit. At least one PDC cutting element 512, configured according to any of the previously described PDC embodiments, may be affixed to the bit body 502. With reference to FIG. 5B, each of a plurality of PDC cutting elements 512 is secured to the blades 504 of the bit body 502 (FIG. 5A). For example, each PDC cutting element 512 may include a PCD table 514 bonded to a substrate 516. More generally, the PCD cutting elements 512 may comprise any PDC disclosed herein, without limitation. In addition, if desired, in some embodiments, a number of the PCD cutting elements 512 may be conventional in construction. Also, circumferentially adjacent blades 504 define so-called junk slots 520 therebetween. Additionally, the rotary drill bit 500 includes a plurality of nozzle cavities 518 for communicating drilling fluid from the interior of the rotary drill bit 500 to the PDCs 512.

FIGS. 5A and 5B merely depict one embodiment of a rotary drill bit that employs at least one PDC fabricated and structured in accordance with the disclosed embodiments, without limitation. The rotary drill bit 500 is used to represent any number of earth-boring tools or drilling tools, including, for example, core bits, roller-cone bits, fixed-cutter bits, eccentric bits, bi-center bits, reamers, reamer wings, or any other downhole tool including superabrasive compacts, without limitation.

The PDCs disclosed herein (e.g., PDC 100 of FIG. 1A) may also be utilized in applications other than cutting technology. For example, the disclosed PDC embodiments may be used in wire dies, bearings, artificial joints, inserts, cutting elements, and heat sinks. Thus, any of the PDCs disclosed herein may be employed in an article of manufacture including at least one superabrasive element or compact.

Thus, the embodiments of PDCs disclosed herein may be used in any apparatus or structure in which at least one conventional PDC is typically used. In an embodiment, a rotor and a stator, assembled to form a thrust-bearing apparatus, may each include one or more PDCs (e.g., PDC 100 of FIG. 1A) configured according to any of the embodiments disclosed herein and may be operably assembled to a downhole drilling assembly. U.S. Pat. Nos. 4,410,054; 4,560,014; 5,364,192; 5,368,398; 5,480,233; 7,552,782; and 7,559,695, the disclosure of each of which is incorporated herein, in its entirety, by this reference, disclose subterranean drilling systems within which bearing apparatuses utilizing superabrasive compacts disclosed herein may be incorporated. The embodiments of PDCs disclosed herein may also form all or part of heat sinks, wire dies, bearing elements, cutting elements, cutting inserts (e.g., on a roller-cone-type drill bit), machining inserts, or any other article of manufacture as known in the art. Other examples of articles of manufacture that may use any of the PDCs disclosed herein are disclosed in U.S. Pat. Nos. 4,811,801; 4,268,276; 4,468,138; 4,738,322; 4,913,247; 5,016,718; 5,092,687; 5,120,327; 5,135,061; 5,154,245; 5,460,233; 5,544,713; and 6,793,681, the disclosure of each of which is incorporated herein, in its entirety, by this reference.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

What is claimed is:

1. A method of fabricating a polycrystalline diamond compact, comprising:
    providing a polycrystalline diamond compact ("PDC") formed in a first high-pressure, high-temperature ("HPHT") process, wherein the PDC includes:
        a substrate; and
        a polycrystalline diamond table attached to the substrate, the polycrystalline diamond table including an upper surface, at least one lateral surface, and a bonding region bonded to the substrate;
    positioning a sink material adjacent to the upper surface of the polycrystalline diamond table; and
    subjecting the PDC and the sink material to a second HPHT process to drive at least a portion of a metal-solvent catalyst out of the polycrystalline diamond table and form a modified region exhibiting porosity, wherein at least one HPHT condition of the second HPHT process is different than that used in the first HPHT process.

2. The method of claim 1, wherein the porosity of the modified region is about 1% to about 15% by volume of the polycrystalline diamond table after the second HPHT process.

3. The method of claim 1, wherein the porosity of the modified region is about 1% to about 15% by volume of the polycrystalline diamond table and extends substantially throughout the polycrystalline diamond table in a region bounded by the upper surface, the at least one lateral surface, and the bonding region after the second HPHT process.

4. The method of claim 1, wherein the sink material includes at least one of a large grain diamond material, hexagonal boron nitride ("HBN"), cubic boron nitride ("CBN"), or graphitic carbon.

5. The method of claim 1, wherein the sink material includes at least one of a large grain diamond material or HBN and a non-Group VIII metal material that at least partially melts in the second HPHT process, infiltrates the polycrystalline diamond table, and causes at least a portion of the metal-solvent catalyst to move out of the polycrystalline diamond table and into the sink material.

6. The method of claim 5, wherein the non-Group VIII metal material includes at least one of copper, aluminum, tin, titanium, gallium, germanium, magnesium, antimony, or zinc.

7. The method of claim 1, wherein the polycrystalline diamond table includes diamond grains exhibiting an average grain size of about 30 µm or less.

8. The method of claim 1, wherein the polycrystalline diamond table includes diamond grains exhibiting an average grain size of about 20 µm or less.

9. The method of claim 1, wherein the metal-solvent catalyst includes cobalt.

10. A method of fabricating a polycrystalline diamond compact, comprising:
    providing a polycrystalline diamond compact ("PDC") formed in a first high-pressure, high-temperature ("HPHT") process, wherein the PDC includes:
        a substrate; and
        a polycrystalline diamond table attached to the substrate, the polycrystalline diamond table including an upper surface, at least one lateral surface, and a bonding region bonded to the substrate;
    positioning a sink material adjacent to at least the upper surface of the polycrystalline diamond table; and
    subjecting the PDC and the sink material to a second HPHT process to remove at least a portion of a metal-solvent catalyst out of the polycrystalline diamond table and into the sink material,
        wherein a porosity of the polycrystalline diamond table increases by at least 1% by volume as a result of the second HPHT process;
        wherein the porosity extends substantially throughout the polycrystalline diamond table along at least a portion of the upper surface and at least a portion of the at least one lateral surface; and
        wherein at least one HPHT condition of the second HPHT process is different than that used in the first HPHT process.

11. The method of claim 10, wherein the porosity of the polycrystalline diamond table increases by at least 2% by volume after the second HPHT process.

12. The method of claim 10, wherein the porosity of the polycrystalline diamond table increases by at least 3% by volume after the second HPHT process.

13. The method of claim 10, wherein the polycrystalline diamond table exhibits a coercivity of about 115 Oersteds or more and a specific magnetic saturation of about 15 Gauss·cm³/gram or less after the second HPHT process.

14. The method of claim 10, wherein the polycrystalline diamond table exhibits a coercivity of about 130 Oersteds or more and a specific magnetic saturation of about 12 Gauss·cm³/gram or less after the second HPHT process.

15. The method of claim 10, wherein the polycrystalline diamond table exhibits a coercivity of about 150 Oersteds or more and a specific magnetic saturation of about 10 Gauss·cm³/gram or less after the second HPHT process.

16. The method of claim 1, wherein the at least one HPHT condition is pressure, and wherein the pressure of the second HPHT process is less than that used in the first HPHT process.

17. The method of claim 1, wherein the at least one HPHT condition is temperature, and wherein the temperature of the second HPHT process is about 1700° C. to about 1900° C. and the temperature of the first HPHT process is about 1200° C. to about 1600° C.

18. The method of claim 10, wherein the at least one HPHT condition is pressure, and wherein the pressure of the second HPHT process is less than that used in the first HPHT process.

19. The method of claim 10, wherein the at least one HPHT condition is temperature, and wherein the temperature of the second HPHT process is about 1700° C. to about 1900° C. and the temperature of the first HPHT process is about 1200° C. to about 1600° C.

\* \* \* \* \*